(12) United States Patent
Zhang (10) Patent No.: US 9,575,750 B2
(45) Date of Patent: Feb. 21, 2017

(54) GENERIC ANNOTATION SEEKER (71) Applicant: Jie Zhang, Shanghai (CN)

(72) Inventor: Jie Zhang, Shanghai (CN)

(73) Assignee: SUCCESSFACTORS, INC., South San Francisco, CA (US)

(*) Notice: Subject to any disclaimer, the term of this patent is extended or adjusted under 35 U.S.C. 154(b) by 1 day.

(21) Appl. No.: 14/568,035

(22) Filed: Dec. 11, 2014

(65) Prior Publication Data

US 2016/0170748 A1    Jun. 16, 2016

(51) Int. Cl.
*G06F 9/44* (2006.01)

(52) U.S. Cl.
CPC ...................................... *G06F 8/73* (2013.01)

(58) Field of Classification Search
None
See application file for complete search history.

(56) References Cited

U.S. PATENT DOCUMENTS

| | | | | |
|---|---|---|---|---|
| 5,706,510 A | * | 1/1998 | Burgoon | G06F 17/30067 |
| 2003/0145281 A1 | * | 7/2003 | Thames | G06F 8/73 |
| | | | | 715/205 |
| 2004/0216173 A1 | * | 10/2004 | Horoszowski | G06F 17/30796 |
| | | | | 725/145 |
| 2004/0255234 A1 | * | 12/2004 | Methot | G06F 9/4446 |
| | | | | 715/276 |
| 2004/0260714 A1 | * | 12/2004 | Chatterjee | G06F 17/30873 |
| 2005/0021689 A1 | * | 1/2005 | Marvin | G06F 8/31 |
| | | | | 709/220 |
| 2005/0097504 A1 | * | 5/2005 | Ballinger | G06F 9/4435 |
| | | | | 717/100 |
| 2005/0192917 A1 | * | 9/2005 | Lubbers | G06F 17/30011 |
| 2005/0256825 A1 | * | 11/2005 | Dettinger | G06F 17/3056 |
| 2006/0048047 A1 | * | 3/2006 | Tao | G06F 17/241 |
| | | | | 715/232 |
| 2006/0075205 A1 | * | 4/2006 | Martin | G06F 17/30887 |
| | | | | 711/200 |
| 2006/0101328 A1 | * | 5/2006 | Albornoz | G06Q 10/10 |
| | | | | 715/201 |
| 2006/0143559 A1 | * | 6/2006 | Spielberg | G06F 3/165 |
| | | | | 715/201 |
| 2007/0226708 A1 | * | 9/2007 | Varma | G06F 8/51 |
| | | | | 717/139 |
| 2007/0288490 A1 | * | 12/2007 | Longshaw | G06F 11/1471 |
| 2008/0007568 A1 | * | 1/2008 | Chou | G06T 19/00 |
| | | | | 345/629 |

(Continued)

OTHER PUBLICATIONS

DLL Loading—Author Stack Overflow, Location: http://stackoverflow.com/questions/3766477/some-basic-questions-about-the-dll-file Publication Date: 2010.*

(Continued)

*Primary Examiner* — Wei Zhen
*Assistant Examiner* — Hossain Morshed
(74) *Attorney, Agent, or Firm* — Horizon IP Pte. Ltd.

(57) ABSTRACT

Disclosed herein are technologies for a generic annotation seeker to generate an index of class annotation, mapping classes with annotations during build time. Files may be dynamically registered and scanned by a registration seeker for revised and updated annotation. This Abstract is submitted with the understanding that it will not be used to interpret or limit the scope or meaning of the claims.

20 Claims, 5 Drawing Sheets

(56) References Cited

U.S. PATENT DOCUMENTS

| | | | | |
|---|---|---|---|---|
| 2008/0022260 A1* | 1/2008 | Kinder | G06F 8/315 | 717/116 |
| 2008/0040656 A1* | 2/2008 | Lammel | G06F 8/315 | 715/230 |
| 2009/0037830 A1* | 2/2009 | Kulkarni | G06F 9/4448 | 715/764 |
| 2009/0198669 A1* | 8/2009 | Shaw | G06F 17/30864 | |
| 2009/0228863 A1* | 9/2009 | Nigul | G06F 8/73 | 717/104 |
| 2010/0138778 A1* | 6/2010 | Dewan | G06F 9/4443 | 715/789 |
| 2012/0072822 A1* | 3/2012 | Bokor | G06F 19/322 | 715/230 |
| 2012/0102456 A1* | 4/2012 | Paulheim | G06F 8/73 | 717/116 |
| 2012/0117096 A1* | 5/2012 | Massand | G06F 17/301 | 707/758 |
| 2013/0275360 A1* | 10/2013 | Kharod | G06F 17/30563 | 707/602 |
| 2013/0275955 A1* | 10/2013 | Agarwal | G06F 8/452 | 717/163 |
| 2013/0339365 A1* | 12/2013 | Balasubramanian | G06F 8/71 | 707/741 |
| 2014/0019843 A1* | 1/2014 | Schmidt | G06F 17/241 | 715/230 |
| 2014/0040863 A1* | 2/2014 | Hale | G06F 8/36 | 717/123 |
| 2014/0229869 A1* | 8/2014 | Chiantera | G06F 9/4443 | 715/763 |
| 2014/0325474 A1* | 10/2014 | Park | G06F 8/315 | 717/108 |
| 2014/0344802 A1* | 11/2014 | Matov | G06F 8/61 | 717/178 |
| 2015/0046914 A1* | 2/2015 | Sahoo | G06F 9/44521 | 717/166 |
| 2015/0063714 A1* | 3/2015 | King | G06K 9/72 | 382/229 |
| 2015/0169294 A1* | 6/2015 | Brock | G06F 11/36 | 717/164 |
| 2015/0199517 A1* | 7/2015 | Rose | G06F 21/57 | 726/22 |
| 2015/0278311 A1* | 10/2015 | Isherwood | G06F 17/30705 | 707/741 |
| 2015/0301840 A1* | 10/2015 | Goetz | G06F 9/44521 | 717/166 |

OTHER PUBLICATIONS

NPL—MSDN—Index Table Pattern—Mar. 2014, located at https://msdn.microsoft.com/en-us/library/dn589791.aspx.*
NPL—Stackoverflow—2010, located at http://stackoverflow.com/questions/3766477/some-basic-questions-about-the-dll-file.*
NPL—TechTarget—2007, located at http://searchwindowsserver.techtarget.com/definition/dynamic-link-library-DLL.*
NPL—MSDN—Index Table Pattern—Mar. 2014, Microsoft, located at https://msdn.microsoft.com/en-us/library/dn589791.aspx.*

* cited by examiner

Fig. 1

```
<index>
  <entry>
    <string>com.successfactors.sca.config.Service</string>
    <set>
      <string>com.successfactors.ruleengine.gorule.service.impl.FireRuleBatchWithResultImpl</string>
      <string>com.successfactors.ruleengine.gorule.service.impl.EvaluateRuleImpl</string>
      <string>com.successfactors.ruleengine.gorule.service.impl.EvaluateRuleBatchImpl</string>
      <string>com.successfactors.ruleengine.gorule.service.impl.FireRuleWithResultImpl</string>
      <string>com.successfactors.ruleengine.gorule.service.impl.GetRulesByRuleTypeImpl</string>
    </set>
  </entry>
  <entry>
    <string>com.successfactors.ruleengine.gorule.function.RuleFunctionContainer</string>
    <set>
      <string>com.successfactors.ruleengine.gorule.function.CoreFunctions</string>
    </set>
  </entry>
  <entry>
    <string>org.jboss.seam.annotations.Name</string>
    <set>
      <string>com.successfactors.ruleengine.gorule.bean.model.RuleCacheFlushProcessor</string>
      <string>com.successfactors.ruleengine.gorule.bean.model.MessageDefinitionFlushProcessor</string>
      <string>com.successfactors.ruleengine.gorule.app.SequenceEntityRegisterer</string>
      <string>com.successfactors.ruleengine.gorule.app.RuleEntitiesRegisterer</string>
    </set>
  </entry>
</index>
```

GENERIC ANNOTATION SEEKER

TECHNICAL FIELD

The present disclosure relates generally to providing and determining annotation of software component classes and other code-related categories.

BACKGROUND

Software systems are made of numerous components or code. Components may be classified into various and numerous classes. Classes may define functionality of components. When development, integration, and/or maintenance of the software system takes place, it is important for users or developers to know the associated functionality of the classes. Typically, this is determined using notes or annotation that is associated with classes. With numerous classes, the task may be difficult to find and determine annotation of the classes.

In object oriented languages, such as Java programming language, annotation may be provided by a tag; however there is no simple or easy way to determine classes and their annotation. A developer or user may have to check each and every class as to its annotation. Furthermore, for certain implementations, it is desirable to be able to seek certain classes that are particularly annotated. For example, current platforms, such as Java programming language based platforms may seek or scan for Java methods that are annotated with "@RuleFunction"; a meta data framework (MDF) may seek for Java methods annotated with "@MDFEntity"; platforms may seek Java classes that are annotated with "@Name"; platforms may seek Java servlets with annotation defined by particular specifications; and so on.

Typical methods to seek classes include a "scanner" method. The scanner method is direct, but may slow startup. Another method is a "registration" method. The registration method may be faster, but a user may have to manually register the classes.

SUMMARY

Disclosed herein are technologies for annotating categories using a pre-cached index that is automatically generated during build time of code. In accordance with one aspect, an index file may be generated as a build file is run, annotations may be mapped to categories and the index file with the mapped annotations may be further archived.

With these and other advantages and features that will become hereinafter apparent, further information may be obtained by reference to the following detailed description and appended claims, and to the figures attached hereto.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

In the description, annotation is automatically provided to classes which define particular software code or code components. It is to be understood that classes are used here as an example. Annotation may also be applied to other areas such as subclasses, interfaces, and so on. Java programming language and Java programming platform are used as an example herein; however, it is to be understood that other programming languages (e.g. object oriented), and computing/programming platforms are also applicable. In particular, methods are described to determine Java classes that are annotated or implement some type of interface. It may be assumed that the Java code is not changed, and that in certain instances some classes may be instrumented or constructed in run time.

Figure 1:
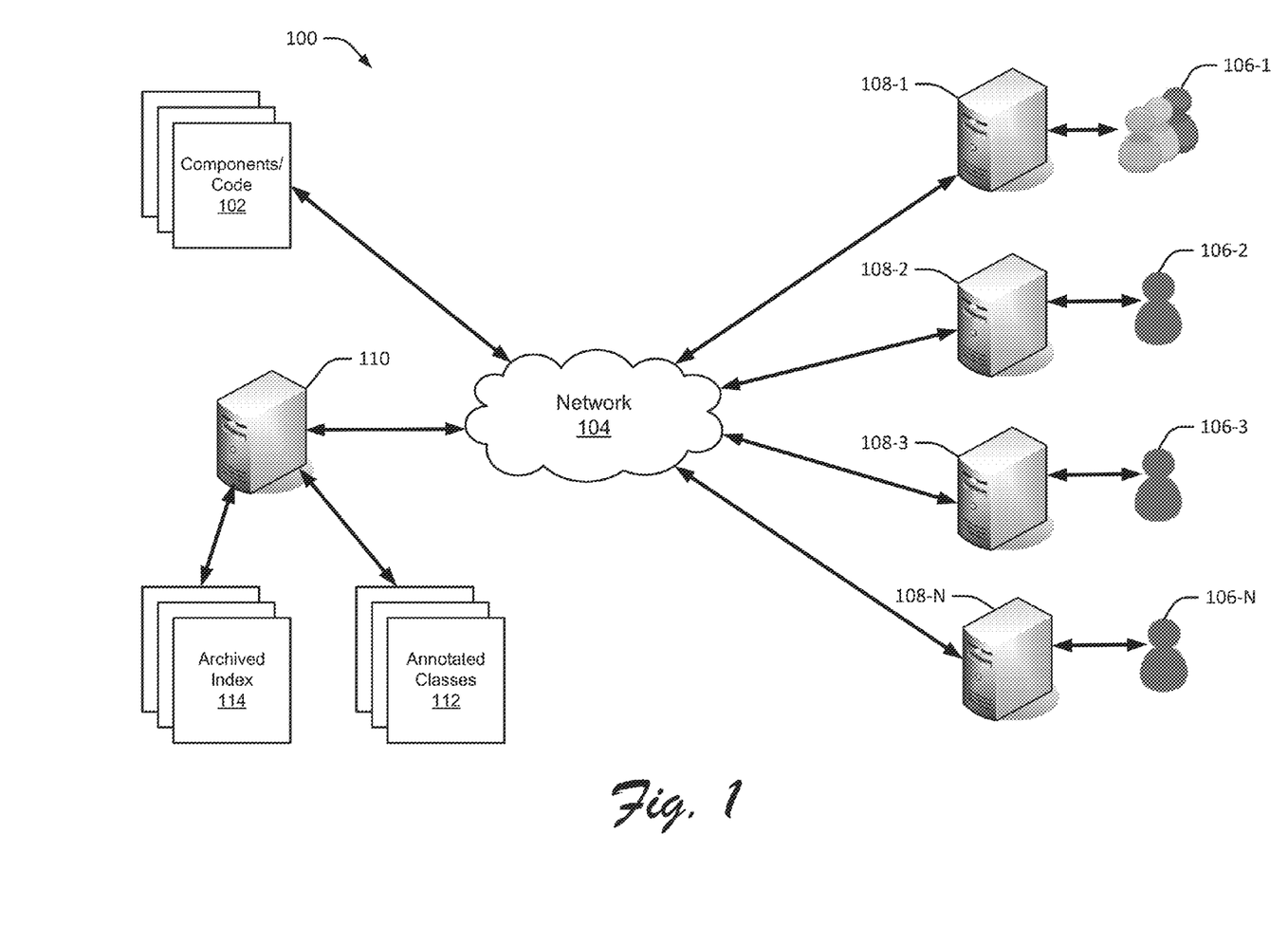
FIG. 1 illustrates an exemplary network or system.

FIG. 1 shows an example system 100 as described in the present implementations herein. It is to be understood, that system 100 may include other devices, components, entities, and the like which are not shown in order to simplify the description.

System 100 includes various components or code 102. The components or code 102 may be part of a larger system or software program. In certain implementations components or code 102 are stored together or stored separately. It is to be understood that it does not matter where such components or code 102 are stored or located; however, the components or code 102 may have access to or implement the use of one another. A network or networks 104, such as the Internet, connects to the components or code 102. The network 104 is connected to various entities.

In this example, multiple users 106 are connected to the network 104 through respective computing devices, such as servers 108. Users 106 may be a group, or a single individual as shown in FIG. 1. A standalone server or computing device 110 may be implemented. In this example, server 110 hosts classes 112. Classes 112 define or classify components or code 102.

The classes 112 may be annotated using the generic annotation seeker or GAS (not shown) described herein. In certain implementations the GAS is hosted in server 110; however, it is to be understood that the GAS may be part of or is included in several servers, devices, and the like, including the "cloud." An archived file index or indices 114 may also be hosted in server 110. For example, in Java language based platforms, Java Archive or JAR files may be used as described below and stored as archive file index (or indices) 114.

Figure 2:
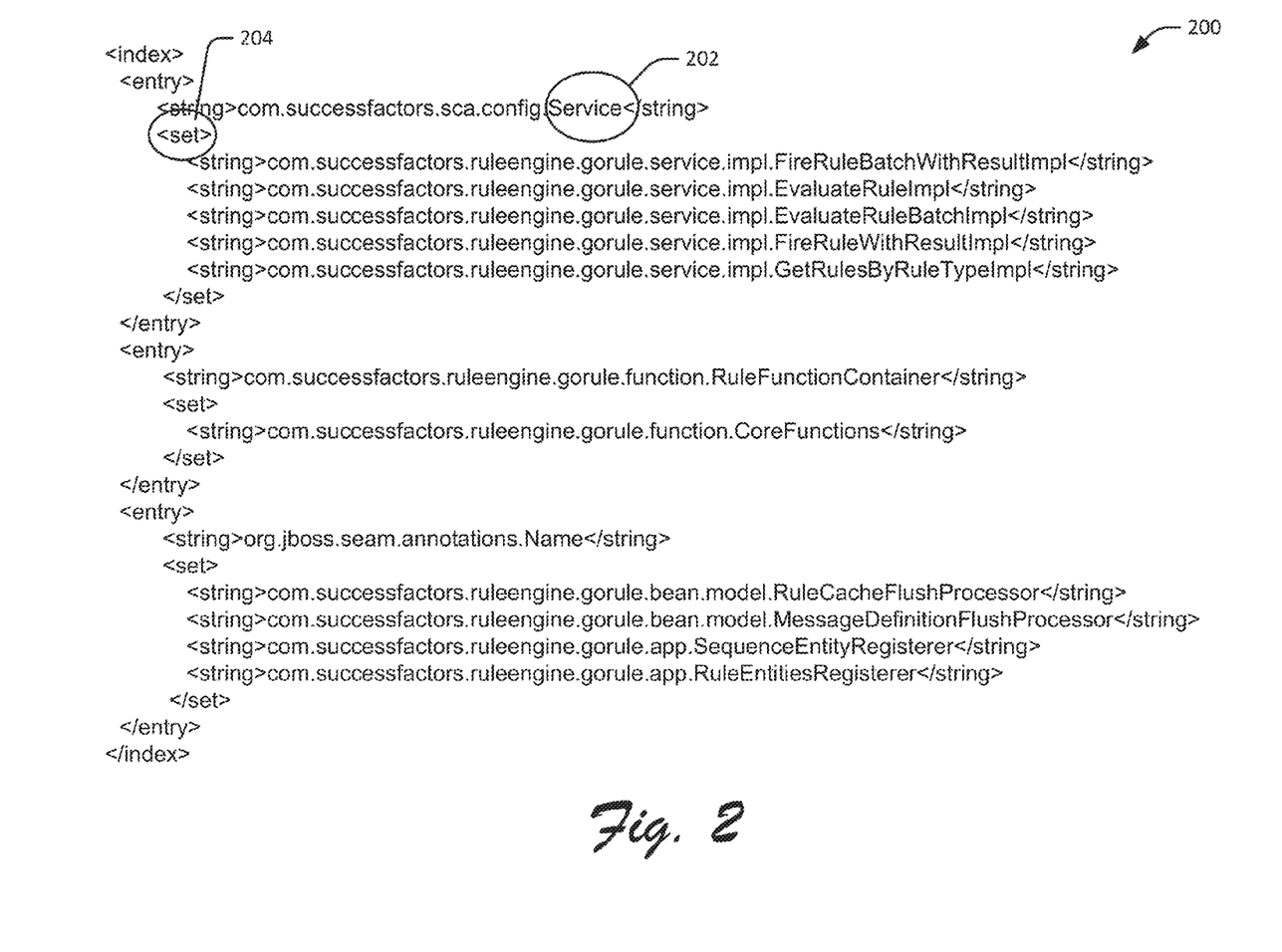
FIG. 2 illustrates exemplary code script of an index for annotation.

FIG. 2 shows exemplary index in the form of a code script or "xml" file 200. For example, xml file 200 may be referred to as "gas.xml" referring to the generic annotation seeker or GAS. The xml file 200 is an index that maps classes with annotations. The xml file 200 may be generated when a Java file is generated, for example during the build process. The xml file 200 may include information or annotation for users/developers.

In this example, the xml file 200 is considered as an annotation index for classes. A string in xml file 200 defines the annotation 202 which is "Service." In other words, classes defined in the xml file 200 are annotated as "Service" classes as defined by annotation 202. In the example, set 204 defines the classes.

Since the classes are now defined or are annotated, during generation of a Java file, there is no need to manually define or register classes with annotation. Because the classes are annotated, it may be more efficient in finding classes that have particular annotation. In this example, classes annotated as "Service" classes. This can lead to faster startup times, since the searching or seeking is more efficient.

In certain implementations, because the xml file 200 is archived, there may be no need to recompile the Java file in order to create the xml file 200. By avoiding recompiling, build times may be reduced and in certain cases eliminated, reducing build costs. Recompilation may take place when the xml file 200 needs to be updated. Recompilation and generation of xml file 200 may take place when classes are added or changed, and/or annotations are added or changed.

Therefore, the generic annotation seeker or GAS seeks classes by using a pre-cached class-annotation index or xml file 200 that is called gas.xml in the example. The gas.xml or xml file 200 includes pre-cached key value entry that defines annotation (i.e., annotation:class).

Figure 3:
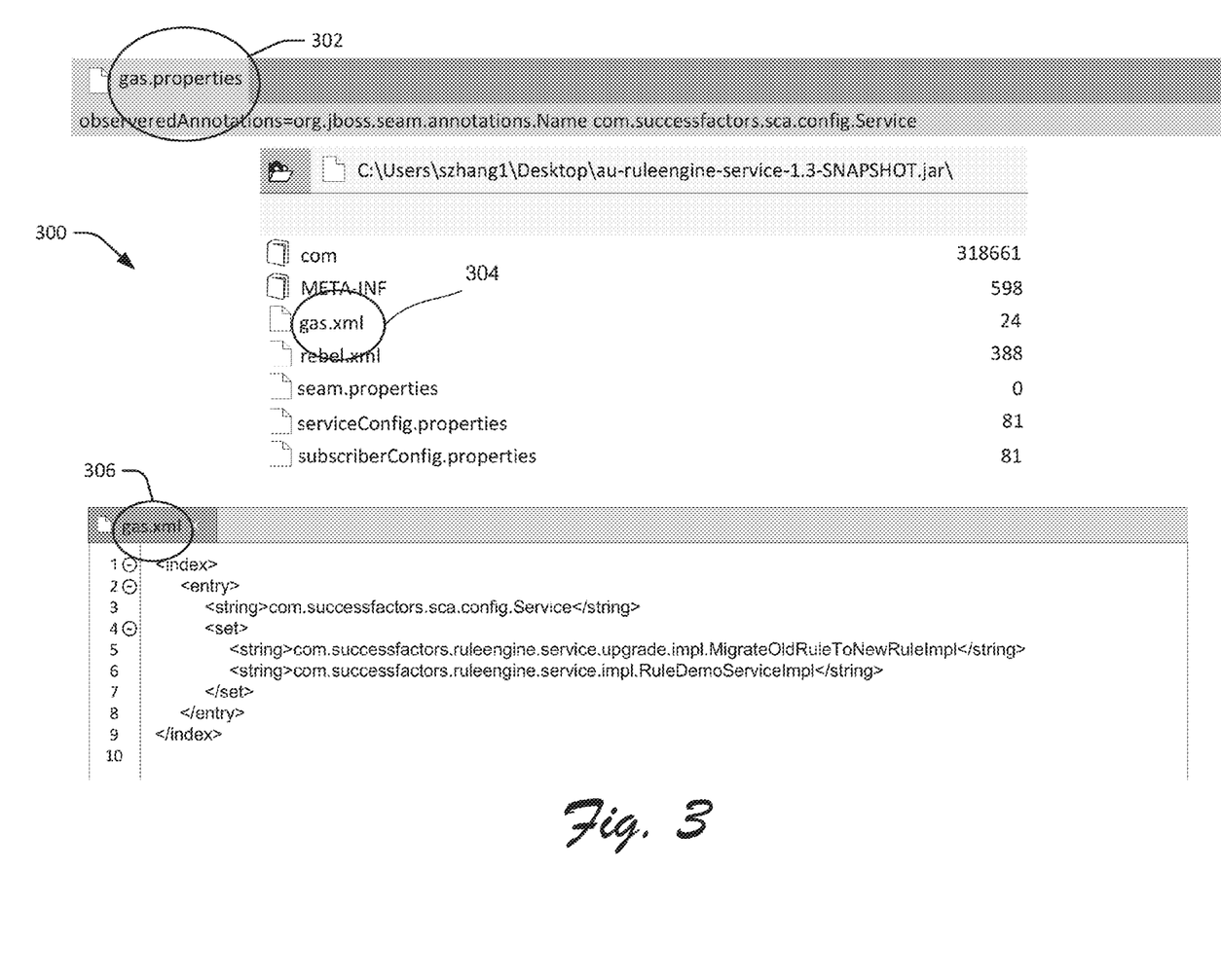
FIG. 3 illustrates exemplary software folders.

FIG. 3 shows exemplary software folders 300 in the present implementations described herein.

Annotations that are to be indexed by GAS may be predefined in the folder "gas.properties" 302. The folder "gas.properties" 302 may reside in a "build-system/lib/gas" folder. The example folder "gas.properties" 302 may be added as indexed annotation.

The file "gas.xml" 304 may be generated into a <RESOURCE_FOLDER> before the build system packages a Java Archive or JAR file. In one implementation, the file "gas.xml" 304 may be packaged with the Java Archive or JAR file, and particularly into a module JAR as illustrated in FIG. 3.

In an implementation, a build system may call GAS.jar to generate the "gas.xml" 306 during "package-service" target. The GAS.jar may package a simple scanner that scans %classes% folder for finding classes by using "ResourceScanner". The file "gas.xml" 306 contains the xml serialized by XStream from a MAP which maps annotation with a set of classes that are annotated with that annotation.

Figure 4:
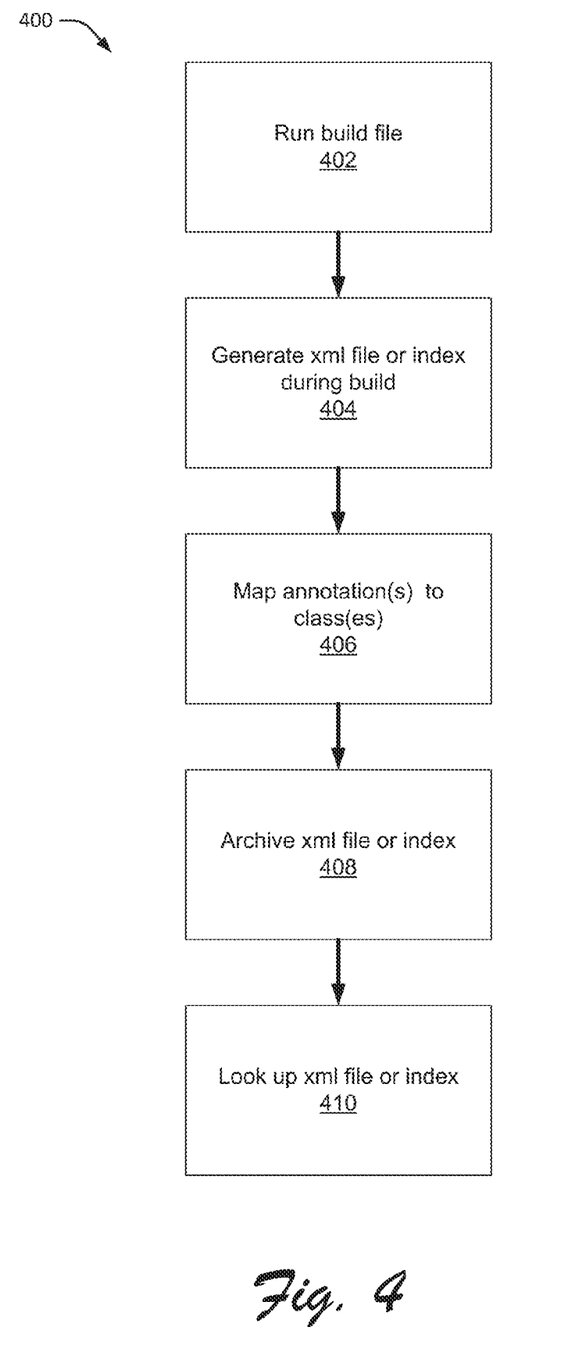
FIG. 4 illustrates an exemplary process flow to generate and implement an annotating index.

FIG. 4 shows an exemplary process 400 for implementing, at least in part, the technology described herein. In particular, process 400 depicts a flow to generate and implement an annotating index. The process 400 may be performed by a computing device. An example architecture of such a computer device is described below with reference to FIG. 5.

At 402, running a build file is performed. In certain implementations, the build file is a Java file that is executed.

At 404, generating an xml file or an index is performed, as the build file is run. This may be automatically performed.

At 406, mapping annotations to classes is performed.

At 408, archiving the xml file or index is performed. The archiving may be performed using a Java Archive (JAR) file.

At 410, a look-up of the xml file or index is performed. The look up may be performed during startup of a system implementing the classes.

Figure 5:
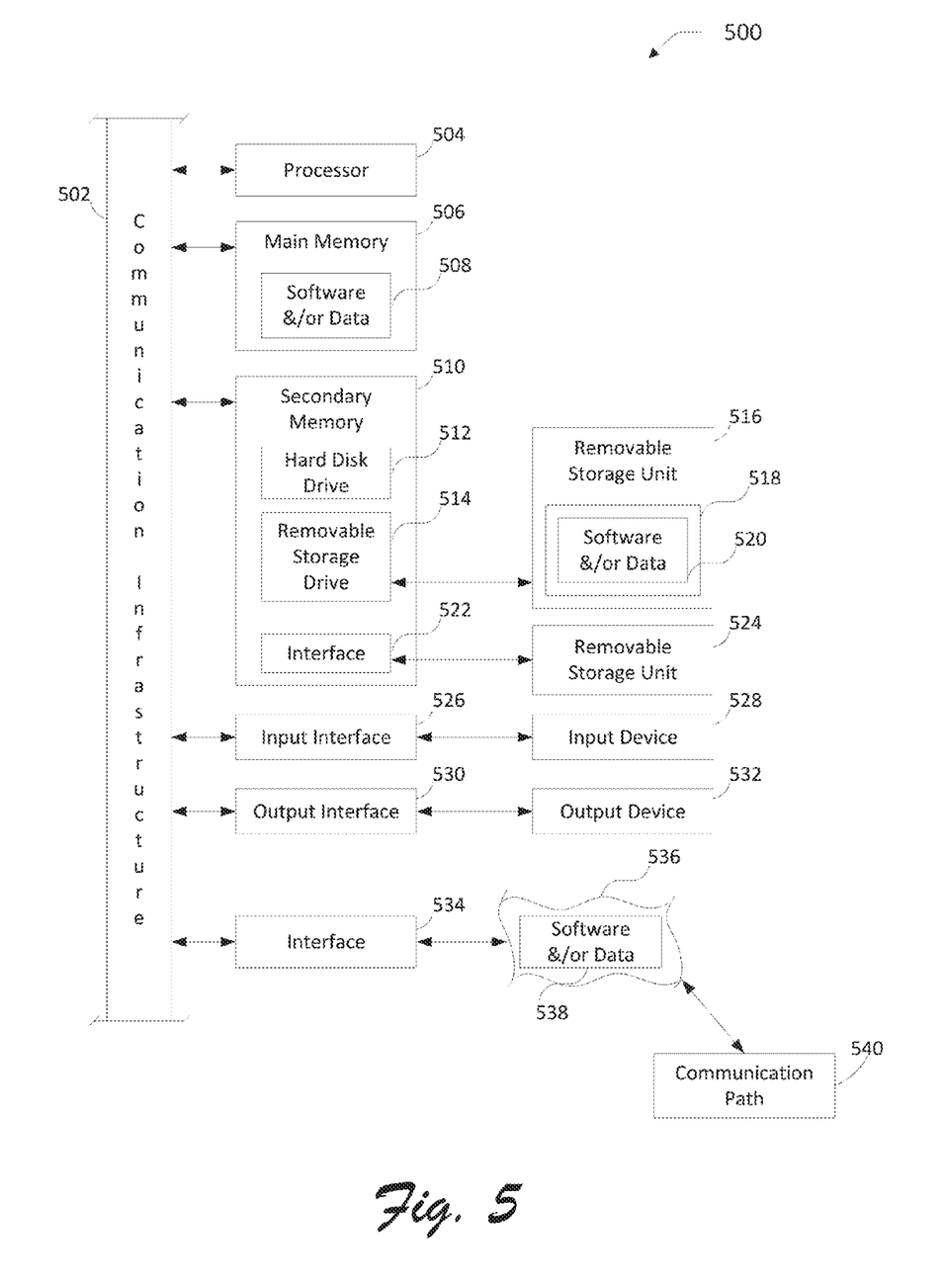
FIG. 5 illustrates an exemplary computing system to implement technologies described herein.

FIG. 5 illustrates an exemplary system 500 that may implement, at least in part, the technologies described herein. The computer system 500 includes one or more processors, such as processor 504. Processor 504 can be a special-purpose processor or a general-purpose processor. Processor 504 is connected to a communication infrastructure 502 (for example, a bus or a network). Depending upon the context, the computer system 500 may also be called a client device.

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, a magnetic tape, an optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 540. Communications path 540 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 516, removable storage unit 524, and a hard disk installed in hard disk drive 512. Computer program medium and computer usable medium can also refer to memories, such as main memory 506 and secondary memory 510, which can be memory semiconductors (e.g., Dynamic Random Access Memory (DRAM) elements, etc.). These computer program products are means for providing software to computer system 500.

Computer programs (also called computer control logic) are stored in main memory 506 and/or secondary memory 510. Such computer programs, when executed, enable computer system 500 to implement the present technology described herein. In particular, the computer programs, when executed, enable processor 504 to implement the processes of aspects of the above. Accordingly, such computer programs represent controllers of the computer system 500. Where the technology described herein is implemented, at least in part, using software, the software may be stored in a computer program product and loaded into computer system 500 using removable storage drive 514, interface 522, hard disk drive 512 or communications interface 534.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method for annotation, comprising:
   running an initial build file;
   generating, based on one or more annotations predefined in a folder, an index file as the initial build the is run, wherein the index file includes first and second strings, wherein the first string defines a key specifying one of the one or more predefined annotations, wherein the second string defines a value specifying a name of a class that is mapped to the annotation, wherein the folder is added as an indexed annotation;
   archiving the index file with the one or more predefined mapped annotations and class; and
   looking up, based on a given annotation, the index file to seek one or more classes associated with the given annotation.

2. The method of claim 1, wherein the initial build file is associated with an object oriented language.

3. The method of claim 1, wherein the initial build file is associated with a Java file.

4. The method of claim 1, wherein the generating the index file comprises generating a markup language file serialized from a map that associates the one or more predefined annotations with the class.

5. The method of claim 1, wherein the generating is implemented during packaging to a target module.

6. The method of claim 1, wherein the index file is a pre-cached annotation index file.

7. The method of claim 1, wherein the archiving is to a Java Archive (JAR) file.

8. The method of claim 1 further comprising looking up the index file during startup of a system.

9. The method of claim 8, wherein the looking up the index file comprises implementing a resource scanner.

10. A device comprising:
    one or more processors; and
    memory coupled to the one or more processors configured to run a build file,
    generate, based on one or more annotations predefined in a folder, an index file as the build file is run, wherein the index file includes first and second strings, wherein the first string defines a key specifying an annotation, wherein the second string defines a value specifying a name of a category that is mapped to the annotation, wherein the folder is added as an indexed annotation,
archive the index file with the mapped annotation and category, and
look up, based on a given annotation, the index file to seek one or more classes associated with the given annotation.

11. The device of claim 10, wherein the build file is an object oriented language file.

12. The device of claim 10, wherein the index file is a markup language script.

13. The device of claim 10, wherein the index file is a pre-cached annotation index file.

14. The device of claim 10, wherein the category comprises a class.

15. The device of claim 10, wherein the build file is a Java file and a Java Archive file is used to archive the index file.

16. The device of claim 10, wherein the index file is provided during startup of a system.

17. The device of claim 10 further comprising a resource scanner to seek categories with annotations.

18. One or more non-transitory computer-readable media storing processor-executable instructions that when executed cause one or more processors perform operations that annotate categories comprising:
running a build file;
generating, based on one or more annotations predefined in a folder, an index file as the build file is run, wherein the index file includes first and second strings, wherein the first string defines a key specifying an annotation, wherein the second string defines a value specifying a name of a category that is mapped to the annotation, wherein the folder is added as an indexed annotation;
and archiving the index file with the mapped annotation and category; and
looking up, based on a given annotation, the index file to seek one or more class associated with the given annotation.

19. The one or more computer-readable media of claim 18, wherein the category comprises a class that defines software components of a software system.

20. The one or more computer-readable media of claim 18, wherein the build file is an object oriented language file and the index file is a markup language file.

* * * * *